United States Patent
Wirz

(10) Patent No.: US 6,575,812 B2
(45) Date of Patent: Jun. 10, 2003

(54) SETTING UP PROCESS FOR A TOOL OR WORKPIECE ON A GEAR MAKING MACHINE

(75) Inventor: Walter Wirz, Pfaffikon (CH)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 09/788,354

(22) Filed: Feb. 21, 2001

(65) Prior Publication Data

US 2001/0022098 A1 Sep. 20, 2001

(30) Foreign Application Priority Data

Mar. 15, 2000 (DE) .......................... 100 12 647

(51) Int. Cl.[7] .............................. B24B 49/00; B24B 5/00
(52) U.S. Cl. ................ 451/9; 451/5; 451/147; 451/219; 451/249; 451/253
(58) Field of Search ................ 451/9, 6, 10, 11, 451/47, 219, 249, 253, 900, 147

(56) References Cited

U.S. PATENT DOCUMENTS

| | | | | |
|---|---|---|---|---|
| 3,711,997 A | * | 1/1973 | Kushigian | 451/9 |
| 4,365,301 A | * | 12/1982 | Arnold et al. | 451/173 |
| 4,729,192 A | * | 3/1988 | Elsdoerfer | 451/5 |
| 4,791,759 A | * | 12/1988 | Komata | 451/5 |
| 4,815,239 A | * | 3/1989 | Sommer | 451/5 |
| 4,825,596 A | * | 5/1989 | Kinner | 451/14 |
| 5,628,673 A | * | 5/1997 | Morooka | 451/9 |
| 5,678,964 A | * | 10/1997 | Dashevsky | 451/9 |
| 5,829,928 A | * | 11/1998 | Harmand et al. | 451/430 |

FOREIGN PATENT DOCUMENTS

| | | |
|---|---|---|
| DE | 4032361 | 4/1992 |
| DE | 19501080 | 7/1996 |
| DE | 19631620 | 2/1998 |

* cited by examiner

Primary Examiner—Joseph J. Hail, III
Assistant Examiner—Hadi Shakeri
(74) Attorney, Agent, or Firm—Browdy and Neimark, P.L.L.C.

(57) ABSTRACT

Determining of the starting and end positions of the machining programme of a gear making machine with respect to the axial position of the workpiece (11, 18) by means of a laser light line (14) projected at right angles to the workpiece axis, the position of which light line relative to the reference point of the tool (5, 17) is known. By mutual displacement parallel to the workpiece axis, the light line (14) and one or both of the workpiece end faces (16) are brought to coincide. The axial positions thus obtained are transmitted to the machine control system. The determining of the axial tool position takes place analogously by the projection of a laser light line onto the circumference surface of the tool (5, 17) at right angles to the tool axis.

9 Claims, 3 Drawing Sheets

SETTING UP PROCESS FOR A TOOL OR WORKPIECE ON A GEAR MAKING MACHINE

FIELD AND BACKGROUND OF THE INVENTION

The invention concerns an apparatus and a process for determining the relative position of a tool and a workpiece prepared for machining on a machine tool.

In the machining of workpieces, the exact point of machining contact of the tool is in many cases not visible because the tool itself hides the point of machining. This applies for example to the continuous generating grinding of gear teeth, particularly in the case of helical gears. On account of the particular form of the tool employed in this process, i.e. the grinding worm, and the conditions of contact between it and the gear teeth to be machined, in which the working positions are only derived by mathematical consideration (intersection), it is not possible to detect the exact point of machining contact, i.e. the point of mesh on the workpiece, optically. Hence when setting the machine the position of the tool and workpiece one to the other, which is required for fixing the starting and end positions of the machining process, cannot be determined by direct visual means.

When setting the machine for machining such a workpiece, the exact axial position of the latter relative to the work spindle after setting up is not usually known, as it is dependent on many different individual dimensions of the work driver, work arbor, spacer collars, and of the workpiece itself. This likewise eliminates the ability to have the axial position of the gear teeth to be machined, relative to the point of machining contact of the grinding worm, calculated by the numerical machine control system by way of the position of the work spindle, although the position of the latter relative to the machine coordinates is just as well known as the point of machining contact of the tool, i.e. the tool reference point. Especially when operating with tapered work arbors the axial workpiece position differs with every set-up, as it is dependent on the bore tolerance or allowances.

In practice one resorts in such cases to the use of mechanical devices such as measuring indicators or the like, which represent in some manner the height of the tool reference point, in order to visually determine the axial position of the workpiece or its teeth. This method is unfavourable as, apart from the the limited attainable accuracy, the differing workpiece sizes often also make differing measuring indicators necessary. Moreover the measuring indicators must be removed from the working area again when the exact axial position of the workpiece has been determined.

A suggestion has also already been made to measure the axial position of the workpiece teeth to be machined relative to the work spindle or to the machine coordinate system by means of a length gauge, and to subsequently put the determined dimension into calculation with the actual position of the tool reference point. But this method also demands, as does the measuring indicator mentioned, a reference surface in the machining space, which is on the one hand difficult to realize and on the other hand means inconvenient manipulations in the generally oily machining space.

SUMMARY OF THE INVENTION

The object of the present invention is to provide a device and a process for determining the axial position of the workpiece teeth on the machine with the workpiece set up, without manual manipulation in the machining space, which is equally suitable without adaptation for all workpiece diameters in question. This task is fulfilled by the combination of features in accordance with the claims.

By means of a laser line projector, which is located in the working area of the machine such that the beam plane it produces is at right angles to the workpiece axis and contains the tool reference point, or is at a known distance from the latter, a line of light is projected onto the circumference surface of the workpiece to be measured. If this beam plane is moved relative to the workpiece in the workpiece axial direction, the projected light line also moves across the gear facewidth. If, with reference to the workpiece, the starting position for the machining programme has been defined for example as the upper end face of the workpiece teeth, then the starting position is attained as soon as the laser light line coincides with the upper end face of the teeth. If the laser line projector is so located that the laser beam plane does not contain the tool reference point, then after attaining the coincidence position the distance between the tool reference point and the laser beam plane must be compensated by an additional axial workpiece displacement corresponding with this distance.

BRIEF DESCRIPTION OF THE DRAWINGS

In the following embodiments of the invention are explained in detail with reference to the drawings. These show.

DETAILED DESCRIPTION OF PREFERRED EMBODIMENTS

Figure 1:
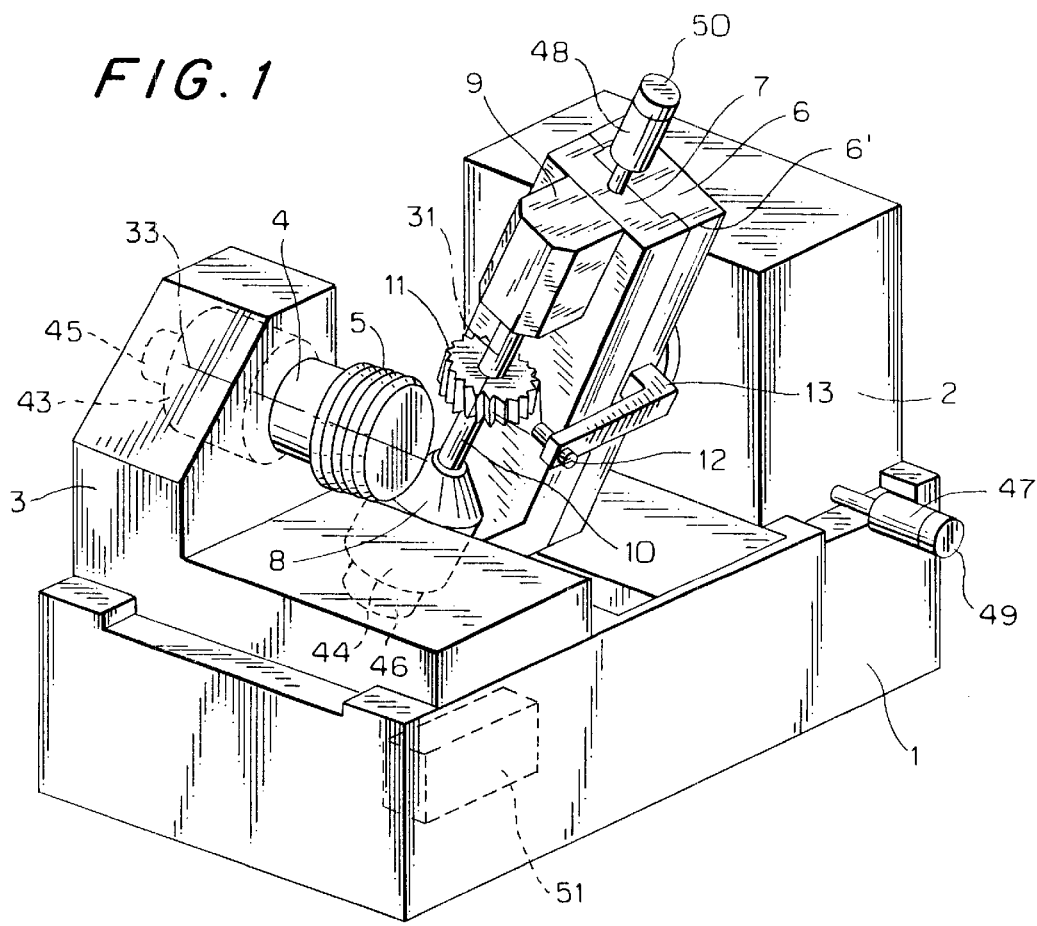
FIG. 1 The diagrammatic representation of the device according to the invention, fitted to a machine for the continuous generating grinding of gears, FIG. 2 An enlarged detail from FIG. 1 with a diagrammatic representation of the beam plane from the laser line projector.

The tooth flank grinding machine in FIG. 1 comprises a machine base 1, on which the cross-slide 2 and the grinding head slide 3 are displaceably located. Located in the grinding head slide 3 is the grinding spindle 4 with the grinding worm 5, rotatable about a horizontal axis 33. Located in the cross-slide 2 and likewise pivotable about a horizontal axis is the turntable (swivel head) 6, which bears the feed slide 7 displaceable on guides 6' in the direction of the workpiece axis 31. Between the work spindle 8, located for rotation in the feed slide 7, and the tailstock 9 is the work arbor 10 to which the workpiece 11 is attached. The laser line projector 12 with the laser beam directed onto the workpiece 11 is firmly attached to the turn-table (swivel head) 6 via the holder 13. It is so aligned that the beam plane emitted from it is at right angles to the workpiece axis 31, and simultaneously contains the tool reference point 34 (see FIG. 4) of the grinding worm 5, or is at a distance from it which is known and is a so-called machine constant. The tool reference point 34 is the point of intersection of the tool axis 33 with the centre distance line 35 (see FIG. 4), which intersects the tool axis 33 and the workpiece axis 31 at right angles.

FIG. 1 indicates the motors 43, 44 and the angular encoders 45, 46 with which the grinding spindle 4 and the work spindle 8 are respectively connected, likewise the feed motors 47, 48 and appropriate position sensors 49, 50 of the slides 2, 7. All motors 43, 44, 47, 48, angular encoders 45, 46 and position sensors 49, 50 are connected with an NC control unit 51, also the non-depicted feed motor and relevant position sensor of the slide 3.

Figure 2:
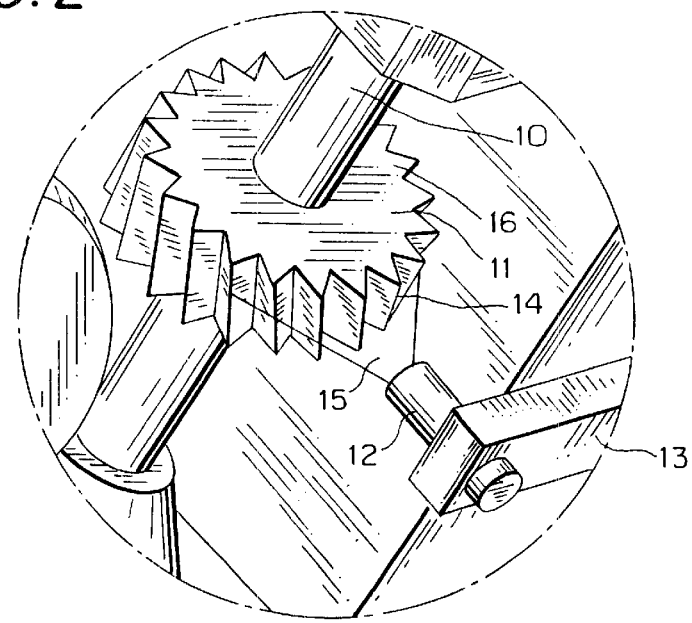

FIG. 2 depicts the laser light line 14 which the diagrammatically shown fan-shaped beam 15 generated by the laser line projector 12 produces on the circumference of the workpiece 11. Tn order to determine the starting or end position of the machining programme, the work feed slide 7 is displaced manually during setting up, such that the light line 14 meets the lower or upper end face 16 of the workpiece 11 defined as the reference position. This position is accepted by the control unit 51 by the "teach-in" method, for example, in response to button actuation by the setter.

Figure 3:
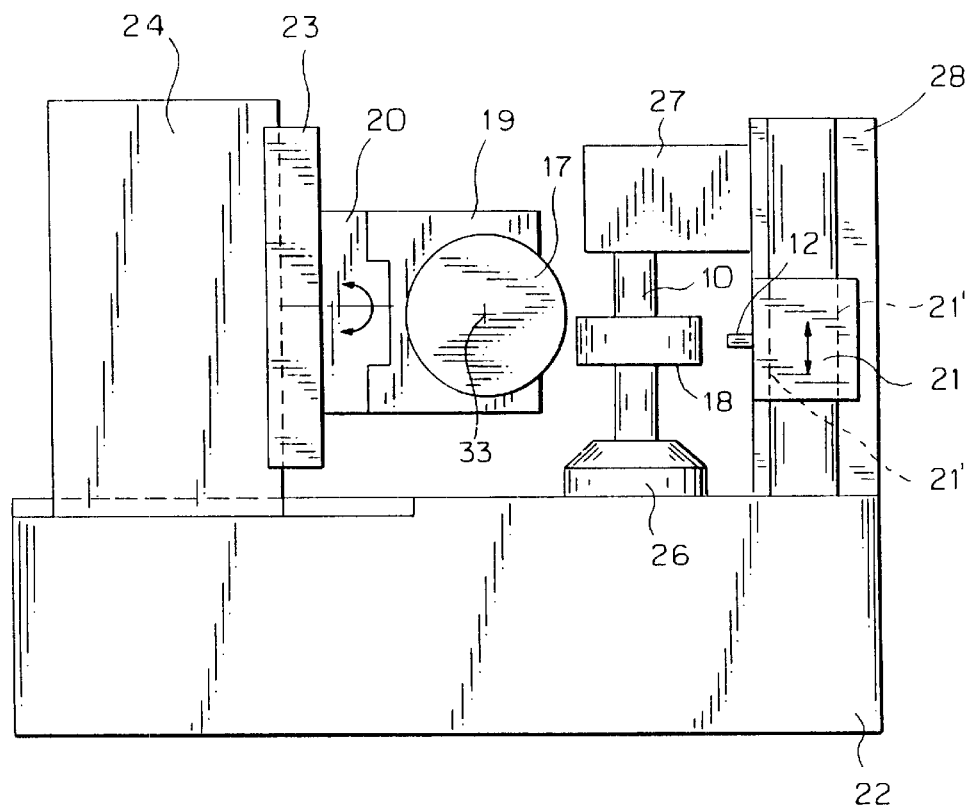
FIG. 3 The diagrammatic representation of a machine for the continuous generating grinding of gears, having a different arrangement of axes than in FIG. 1, and FIG. 4 The position of the laser beam planes when determining the positions of workpiece and tool.
Figure 5:
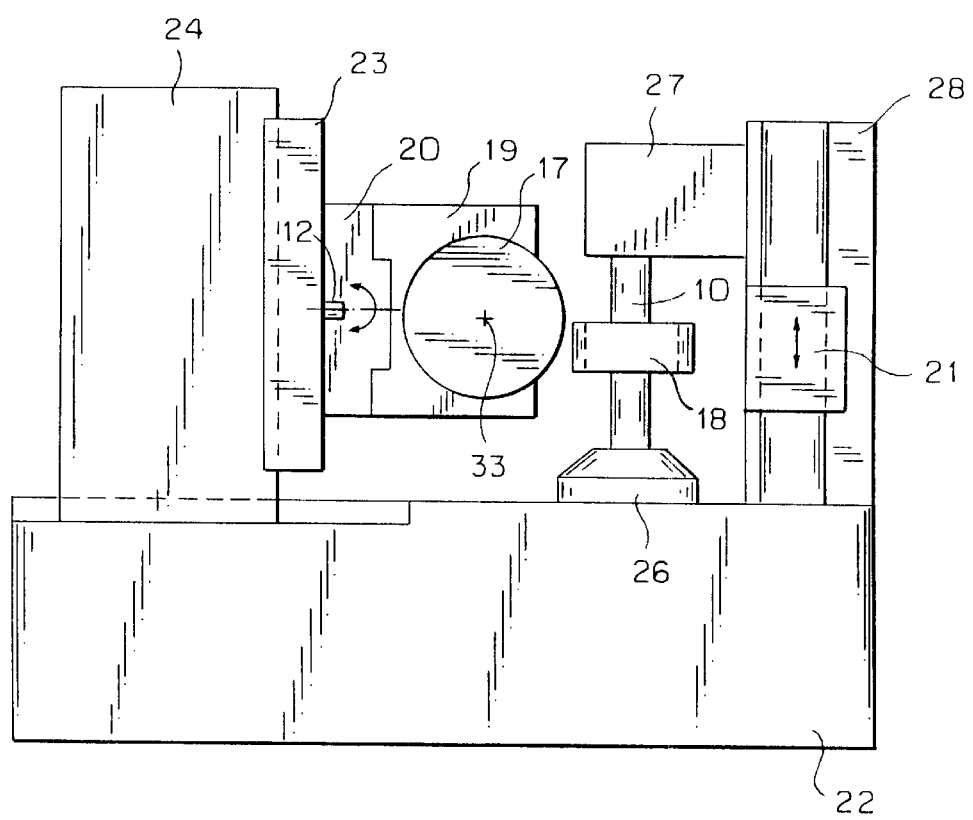
FIG. 5 The machine of FIG. 3 wherein the laser line projection is located on the feedslide.

In machine configurations where, as in FIG. 3, the tool 17 moves relative to the stationary workpiece 18, the laser line projector is best attached to the feed slide 23 (shown in FIG. 5), and moreover such that the laser beam plane generated once again contains the reference point of the tool 17. In this case too the starting position for the machining with the tool 17 is given directly by the coincidence of the projected light line with the end face of the gear teeth.

A further possibility is the attachment of the laser line projector 12 to a separate slide 21, displaceable on guides 21' parallel to the workpiece axis via the NC control unit, as shown in FIG. 3. If this slide can be displaced independent of all other machine motions, a measurement of the axial position of the workpiece 18 is still possible while other operations are simultaneously in progress on the machine, during profiling of the grinding work for example, where all other machine motions are employed. Such an additional displaceable slide unit 21 can thus by the simultaneous operational sequence lead to a significant saving in time and hence between exploitation of the entire machine.

In the same manner as for determining the axial position of the workpiece, the invention can also be used for determining the axial position of the tool, in that with a beam plane from a laser line projector a laser light line at right angles to the tool axis is produced on the circumference surface of the tool, and by relative axial displacement the thus generated laser light line is brought to coincide with an arbitrarily definable, prominent reference point on the tool, from which point the actual starting and end positions of the tool are determined by mathematical analysis.

Figure 4:
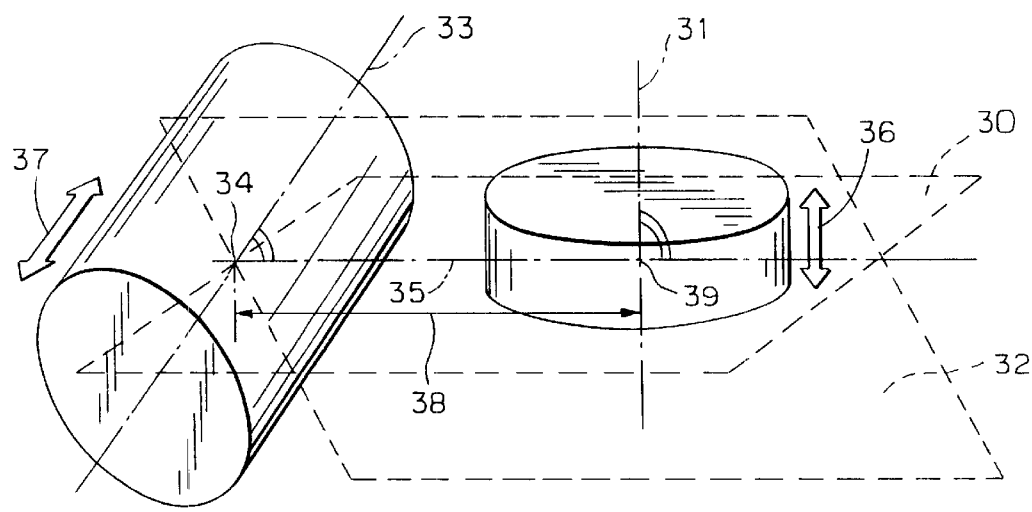

FIG. 4 depicts diagrammatically the geometrical position of the beam plane of the laser line projector for both applications of the invention. Herein the arrow 36 indicates the workpiece axial displacement, arrow 37 the tool axial displacement, and arrow 38 the centre distance between tool and workpiece. The centre distance line 35 passes through both the tool reference point 34 and the workpiece reference point 39, in which it intersects with the workpiece axis 31 at right angles. The determining of the axial position of the workpiece takes place by the relative displacement of the beam plane 30 (which is at right angles to the workpiece axis) in the direction of the workpiece axis 31; the determining of the axial position of the tool by the relative displacement of the beam plane 32 (which is at right angles to the tool axis) in the direction of the tool axis 33.

Characteristic for the two beam planes 30, 32 is that they lie at right angles to the workpiece axis 31 and tool axis 33 respectively, and that after setting up they contain the path 35 of the shortest centre distance between the two crossed (skew) axes.

In the same way as for the continuous generating grinding of gears selected here as example, the invention is also applicable for similar gear machining processes, such as for index-generative and profile grinding, hobbing, shaving, fine machining and gear tooth honing, etc.

What is claimed is:

1. A device for setting up a work-piece on a machine for fine machining of gears by a gear-shaped or worm-shaped tool, wherein the workpiece is positioned relative to the tool for determining a starting and an end position of a machining operation, the device comprising a machine base (1, 22), a tool spindle (4) located for rotation about a tool axis (33), the tool spindle being connected to a first motor (43) and to a first angular encoder (45), a work spindle (8, 26) located for rotation about a workpiece axis (31), the work spindle being connected to a second motor (44) and to a second angular encoder (46), a first slide (2, 19) for displacing the tool spindle (4) relative to the work spindle (8, 26) parallel to the tool axis (33), a second slide (7, 23) for displacing the work spindle (8, 26) relative to the tool spindle (4) parallel to the workpiece axis (31), wherein both slides can be actuated by one feed drive element (47, 48) each and a slide stroke is measured by one position sensor (49, 50) each, and wherein all motors, feed drive elements position sensors and angular encoders are connected with an NC control unit (51), the device further comprising a laser line projector (12), a beam plane (30) of which intersects the workpiece axis (31) at right angles, and which is displaceable relative to the work spindle (8) parallel to the workpiece axis (31), a displacement stroke being measured by one of said position sensors (49, 50) connected to the control unit (51).

2. The device according to claim 1, in which the work spindle (26) is located for rotation on the machine base (22) and the tool spindle (4) is displaceable relative to the machine base (22) via the first and second slides (19, 23) and in which the laser line projector (12) is attached to the second slide (23).

3. The device according to claim 1, in which in the first slide (2) a swivel head (6) is located for pivoting about an axis at right angles to the workpiece axis (31) and the second slide (7) is displaceable on the swivel head (6), and in which the laser line projector (12) is attached to the swivel head (6).

4. The device according to claim 3, in which the laser line projector (12) is attached to a third slide (21), which is displaceable parallel to the workpiece axis (31) independent of other NC-axes of the device.

5. The device according to claim 2, in which the beam plane (30) of the laser line projector (12) intersects a tool reference point (34) or is at a pre-specified distance from said point.

6. A device for setting up a workpiece on a machine for fine machining of gears by a gear-shaped or worm-shaped tool, wherein the workpiece is positioned relative to the tool for determining a starting and an end position of a machining operation, the device comprising a machine base (1, 22), a tool spindle (4) located for rotation about a tool axis (33), the tool spindle being connected to a first motor (43) and to a first angular encoder(45), a work spindle (8, 26) located for rotation about a workpiece axis (31), the work spindle being connected to a second motor (44) and to a second angular encoder (46), a first slide (2, 19) for displacing the tool spindle (4) relative to the work spindle (8, 26) parallel to the tool axis (33), a second slide (7, 23) for displacing the work spindle (8, 26) relative to the tool spindle (4) parallel to the workpiece axis (31), wherein both slides can be actuated by one feed drive element (47, 48) each and a slide stroke is measured by one position sensor (49, 50) each, and wherein all motor, feed drive elements, position sensors and angular encoders are connected with an NC control unit (51), the device further comprising a laser line projector (12), a beam plane (30) of which intersects the tool spindle (33) at a right angle and which is displaceable relative to the tool spindle (4) parallel to the tool axis (33), wherein a displacement stroke is measured by one of the position sensors (49, 50) connected with the control unit (51).

7. A process for setting up a workpiece having teeth on a machine for fine machinery of gears by a gear-shaped or worm-shaped tool, the process comprising the steps of:

positioning the workpiece relative to the tool so as to determine a starting and an end position of a machining operation;

projecting a laser light line (14) onto the teeth of the workpiece at a right angle to an axis of the workpiece by means of a beam plane (15) from a laser line projector (12);

bringing the laser light line into a position by a relative axial displacement to coincide with an end face (16) of the workpiece; and entering the position obtained into a control unit (51);

wherein the relative axial displacement of the laser light line (14) on the workpiece teeth is effected by axial displacement of the workpiece (11).

8. A process for setting up a workpiece having teeth on a machine for fine machinery of gears by a gear-shaped or worm-shaped tool, the process comprising the steps of:

positioning the tool relative to the workpiece so as to determine a starting position and an end position of a machining operation;

projecting a laser light line (14) onto a circumferential surface of the workpiece at a right angle to an axis (33) of the tool (15) by means of a beam plane (32) from a laser line projector (12);

bringing the laser light line into a position by a relative axial displacement to coincide with a prominent point on the tool (5) from which point said starting and end position of the tool is determined by mathematical analysis;

entering the position obtained into a control unit (51);

wherein the relative axial displacement of the laser light line (14) on the circumferential surface of the tool (5) is effected by axial displacement of the tool (5).

9. A process for setting up a workpiece having teeth on a machine for fine machinery of gears by a gear-shaped or worm-shaped tool, the process comprising the steps of:

positioning the tool relative to the workpiece so as to determine a starting and an end position of a machining operation;

projecting a laser light line (14) onto a circumferential surface of the workpiece at a right angle to an axis (33) of the tool (15) by means of a beam plane (32) from a laser line projector (12);

bringing the laser light line into a position by a relative axial displacement to coincide with a prominent point on the tool (5) from which point said starting position of the tool is determined by mathematical analysis;

entering the position obtained into a control unit (51);

wherein the relative axial displacement of the laser light line (14) on the circumferential surface of the tool (5) is effected by the displacement of the beam plane (32) of the laser line projector (12) in an axial direction of the tool (5).

* * * * *